(12) United States Patent
Quah (10) Patent No.: US 9,889,392 B2
(45) Date of Patent: Feb. 13, 2018

(54) GREASE SEPARATOR

(71) Applicant: Teik Sim Quah, Wichita, KS (US)

(72) Inventor: Teik Sim Quah, Wichita, KS (US)

(*) Notice: Subject to any disclaimer, the term of this patent is extended or adjusted under 35 U.S.C. 154(b) by 89 days.

(21) Appl. No.: 15/173,353

(22) Filed: Jun. 3, 2016

(65) Prior Publication Data

US 2016/0279539 A1 Sep. 29, 2016

(51) Int. Cl.
| | | |
|---|---|---|
| *E03F 5/16* | (2006.01) | |
| *B01D 21/00* | (2006.01) | |
| *B01D 17/02* | (2006.01) | |
| *B01D 21/24* | (2006.01) | |

(52) U.S. Cl.
CPC ...... *B01D 21/0012* (2013.01); *B01D 17/0211* (2013.01); *B01D 21/0018* (2013.01); *B01D 21/245* (2013.01); *B01D 21/2405* (2013.01); *E03F 5/16* (2013.01)

(58) Field of Classification Search
CPC ... E03F 5/16; B01D 17/0211; B01D 17/0214; B01D 21/0012; B01D 21/0018; B01D 21/245; B01D 21/2461
USPC ........................................ 210/521, 523, 538
See application file for complete search history.

(56) References Cited

U.S. PATENT DOCUMENTS

| | | | |
|---|---|---|---|
| 4,104,164 A | 8/1978 | Chelton | |
| 4,113,617 A * | 9/1978 | Bereskin | E03F 5/16 210/521 |
| 4,145,287 A | 3/1979 | Walker et al. | |
| 4,533,470 A | 8/1985 | Gyulavari | |
| 4,735,728 A | 4/1988 | Wemhoff | |
| 4,997,562 A | 3/1991 | Warner | |
| 5,030,357 A * | 7/1991 | Lowe | B01D 17/0214 210/804 |
| 5,178,754 A | 1/1993 | Batten et al. | |
| 5,225,085 A | 7/1993 | Napier et al. | |
| 5,445,730 A | 8/1995 | Pattee | |
| 5,453,187 A | 9/1995 | Plumb | |
| 5,503,747 A * | 4/1996 | Vion | B01D 21/2461 210/521 |
| 5,543,064 A * | 8/1996 | Batten | E03F 5/16 210/521 |
| 5,714,069 A | 2/1998 | Sager | |

(Continued)

FOREIGN PATENT DOCUMENTS

| | | |
|---|---|---|
| AU | 2005100746 A4 | 10/2005 |
| JP | 2010184205 A | 2/2009 |

(Continued)

*Primary Examiner* — Christopher Upton
(74) *Attorney, Agent, or Firm* — Kenneth H. Jack; Davis & Jack, L.L.C.

(57) ABSTRACT

A grease separator incorporating a vessel having an upper opening and an interior space, the vessel further having a floor, a front wall, a rear wall, a left wall, and a right wall; a water ejection port positioned at the front wall; left and right flow ports respectively positioned at the left and right walls; a separator baffle and a damping baffle; slide channels adapted for alternatively positioning the separator baffle at the left and right ends of the vessel's interior, the slide channels being further adapted for positioning the damping baffle oppositely from the separator baffle; and a submersible pump having a water intake port positioned at the lower end of the vessel's interior, the submersible pump having an output communicating with the water ejection port.

11 Claims, 5 Drawing Sheets

(56) References Cited

U.S. PATENT DOCUMENTS

| | | | |
|---|---|---|---|
| 6,238,572 B1 | 5/2001 | Batten | |
| 6,395,181 B1 | 5/2002 | Mullerheim | |
| 6,517,715 B1 * | 2/2003 | Batten | B01D 17/0211 |
| | | | 210/521 |
| 6,641,721 B2 | 11/2003 | Mullerheim | |
| 7,641,805 B2 | 1/2010 | Batten et al. | |
| 7,682,509 B2 | 3/2010 | Murray et al. | |
| 7,815,800 B2 * | 10/2010 | Komatsu | E03F 5/16 |
| | | | 210/538 |
| 8,153,004 B2 * | 4/2012 | Rodriguez-Jovet | B01D 17/0214 |
| | | | 210/521 |
| 8,871,089 B2 | 10/2014 | Early et al. | |
| 9,771,711 B1 * | 9/2017 | Batten | E03F 5/16 |
| 2016/0016824 A1 * | 1/2016 | Dawes | E03F 5/16 |
| | | | 210/519 |

FOREIGN PATENT DOCUMENTS

| | | |
|---|---|---|
| JP | 2013022586 A | 7/2011 |
| WO | WO2008057033 A1 | 5/2008 |

\* cited by examiner

GREASE SEPARATOR

FIELD OF THE INVENTION

This invention relates to grease separators or grease traps which are installed and used within the kitchens of commercial restaurants. More particularly, this invention relates to such grease separators which are equipped with submersible electric motor powered water purging pumps.

BACKGROUND OF THE INVENTION

Commercial kitchens commonly include a dishes and utensils cleaning area which is removed from the food preparation and food storage areas of the kitchen. Automatic dish washing equipment and pots and utensils cleaning sinks are typically installed within such dish washing areas. Such dishwashing equipment commonly include water drains which carry away grease and food debris ladened waste water. In many circumstances, it is not appropriate to route such waste water directly into a restaurant's sewer drainage system. In such circumstances, grease and debris separating equipment is commonly installed mid-line between the dishwashing equipment and the restaurant's sewer drainage system.

Where a restaurant's grease separating unit is equipped with a submersible electric pump water purging system, three of the separator's four walls typically become dedicated to particular uses, they being: a) intake flow of the debris and grease ladened waste water; b) output flow of cleaned grease separated water; and c) purge pump ejection flow. In installation of such grease separators within the dishwashing area of a commercial kitchen, the wall of the separator which is dedicated to intake flow (i.e., wall "a") is preferably oriented toward the dishwashing equipment and sinks from which the grease and debris ladened waste water flows. Also in such dishwashing area installation, the purge pump ejection flow is preferably situated at a grease separator front wall (i.e., wall "c") which is opposite a back wall which typically faces a kitchen wall. In many commercial kitchens, the only suitable location for installation of such grease separator unit is rightwardly from the sink and dishwashing equipment. Alternatively, in other kitchens, the only suitable location is leftwardly from such equipment. Such alternative left and right locations of grease separating units in combination with such units' dedication of walls to intake flow, output flow, and ejection flow, creates problems and difficulties in mounting and installing grease separating units within commercial kitchens.

The instant inventive commercial kitchen grease separator solves or ameliorates the problems and difficulties set forth above by configuring the separator's left and right ends for alternative and selective service as a waste water intake end.

BRIEF SUMMARY OF THE INVENTION

A major structural component of the instant inventive grease separator comprises a water tight vessel which preferably opens upwardly. In the preferred embodiment, the vessel is box configured having stainless steel walls and a hermetically sealed stainless steel floor. In the preferred embodiment, the vessel further comprises left and right walls and front and rear walls.

A further structural component of the instant inventive grease separator comprises a water ejection port. In a preferred embodiment, the water ejection port is centrally positioned upon the front wall of the vessel. For purposes of leak prevention, the water ejection port preferably resides at the front wall's upper end. In the preferred embodiment, the water ejection port forms a male GHT nipple (garden hose thread) having an outside diameter of 1.0625". Such water ejection port configuration advantageously allows a common garden hose to be periodically attached for receiving pump ejected water and debris from the vessel.

Further structural components of the instant inventive grease separator comprise left and right flow ports which are respectively positioned at upper ends of the vessel's left and right walls. In the preferred embodiment, the left and right flow ports outwardly form left and right hose attachment nipples.

Further structural components of the instant inventive grease separator comprise a grease separating baffle and at least a first water flow damping baffle. In the preferred embodiment, each of such baffles is fitted for downward receipt into the vessel's interior space.

Further structural components of the instant invention comprise mounting means which are adapted for alternatively positioning the separator baffle at either the left end or the right end of the vessel's interior. In a preferred embodiment, the mounting means are further adapted for alternatively positioning the at least first water flow damping baffle at the end of the vessel which is opposite the selected leftward or rightward positioning of the separator baffle.

A further structural component of the instant inventive grease separator comprises a submersible pump having a water intake port and a water output port at the pump's high pressure end. In a preferred embodiment, the submersible pump is electric motor powered, and is positioned within the vessel's interior so that the low pressure intake port is downwardly situated at or near the vessel's floor. In the preferred embodiment, a pipe, tube, or other fluid conduit is provided for communicating water and debris ejected by the pump from the pump's output port to the vessel's front wall water ejection port.

In operation of the instant inventive grease separator, and assuming, for the sake of example, that a grease separator unit installation site is located rightwardly from a commercial kitchen's dishwashing sink, the separator's mounting means may be utilized for positioning the separator baffle rightwardly from the submersible pump. At its rightwardly mounted position, the separator baffle preferably immediately leftwardly overlies the inner opening of the right wall flow port. Contemporaneously, the mounting means may be further utilized for mounting the at least first flow damping baffle leftwardly from the pump, at a position which immediately rightwardly overlies the inner end of the left wall flow port. Thereafter, tubes, pipes, or hose conduits may be utilized for interconnecting the sink with the left flow port, and for separately interconnecting the right flow port with a sewer drain. Alternatively, in the event that the operating location of the grease separator must be leftwardly from the sink, all of the orientations of the baffles, connections, and conduits discussed above may be conveniently reversed.

In the preferred embodiment of the instant inventive grease separator, the mounting means comprise slide channel and slide ridge combinations and/or suspension hook and hook ridge or edge combinations. Suitably, the mounting means may alternatively comprise eyed overlapping flanges and screw fastener combinations. Other commonly known releasable fasteners may be suitably utilized.

In the preferred embodiment of the instant invention, the separator baffle comprises a flat panel having a width fitted to the front-to-rear dimension of the vessel. The invention's at least first flow damping baffle is suitably configured substantially identically with the separator baffle but having a lesser depth dimension. Alternatively, the invention's flow damping baffle may be further configured as a debris trapping sieve. In the event that a debris trapping sieve is provided, the selected means for mounting for such sieve preferably comprises a suspension hook which may alternatively engage either the upper end or edge of the vessel's left wall or the upper end or edge of the vessel's right wall.

The lower end of the vessel component of the instant inventive grease separator is preferably configured to present a plurality of downwardly extending floor contacting legs or feet. In the preferred embodiment, a centrally positioned floor supporting leg is configured as a sump which opens upwardly within the interior space of the vessel. Where the preferred sump configured floor supporting leg is provided, the submersible pump preferably rests within the sump for drawing water and collected food debris from the sump. Accordingly, in the preferred embodiment of the instant invention, the sump component dually functions for mechanical columnar support of the floor of the vessel and for collection of food debris for efficient pump actuated purging.

Assuming that, as is preferred, the submersible pump is electric powered having a power cord, the instant invention preferably further comprises a chambered lid which forms and defines a convenient storage space for receiving and storing a pump power cord.

Accordingly, objects of the instant invention include the provision of a grease separator which incorporates structures and components, as described above, and which arranges those structures and components in relation to each other in manners described above, for the achievement of the functional benefits described above.

Other and further objects, benefits, and advantages of the instant invention will become known to those skilled in the art upon review of the Detailed Description which follows, and upon review of the appended drawings.

DETAILED DESCRIPTION OF A PREFERRED EMBODIMENT

Figure 1:
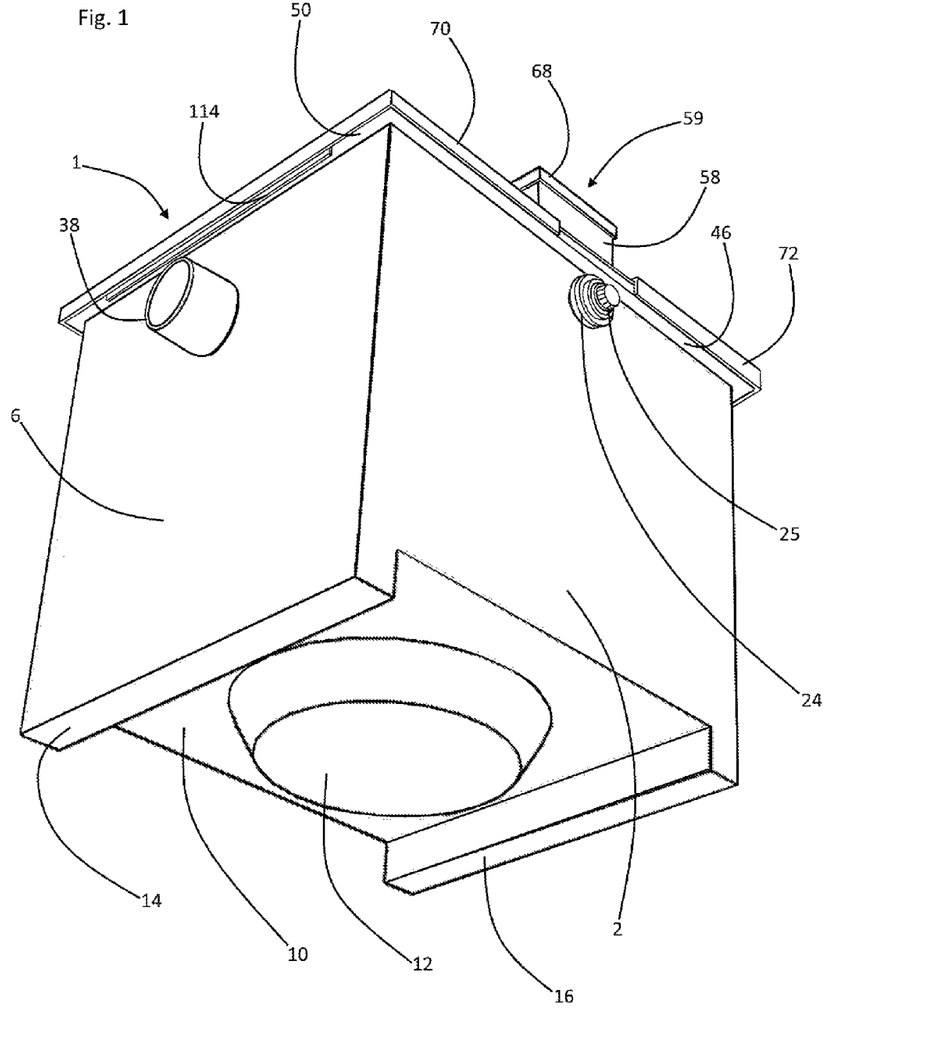
FIG. 1 is a perspective view of the instant inventive grease separator.
Figure 2:
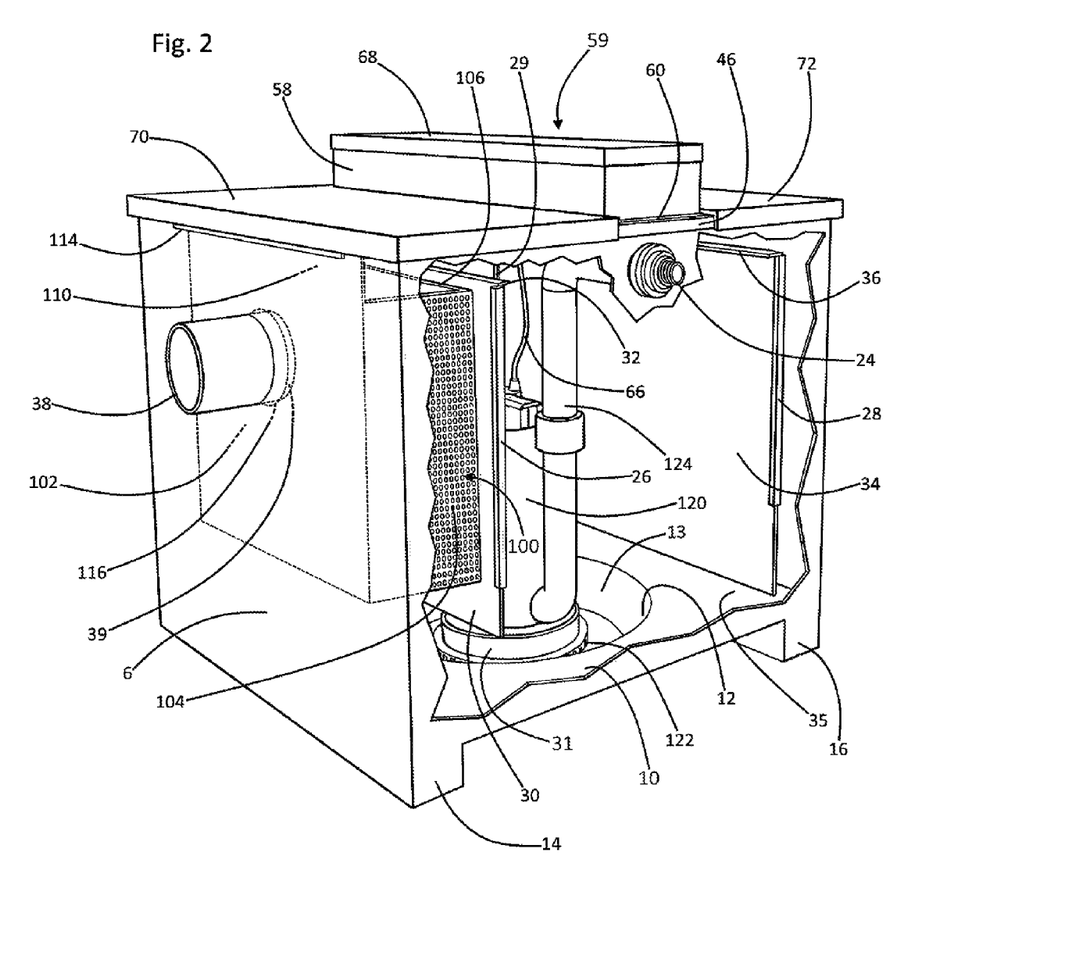
FIG. 2 is an alternate perspective view of the separator of FIG. 1, the view of FIG. 2 including a cutaway within a front wall for viewing interior structures.

Referring now to the drawings and in particular to Drawing FIGS. 1-6, a preferred embodiment of the instant inventive grease separator is referred to generally by Reference Arrow 1. The separator 1 comprises an upwardly opening vessel having a front wall 2 and a rear wall 4. The separator's vessel component further has a left wall 6, a right wall 8, and a floor 10. Left and right legs 14 and 16, and a medial leg 12 extend downwardly from the floor 10, the extension of leg 12 preferably being substantially equal to the downward extensions of the left and right legs 14 and 16. As is shown in FIG. 2, the medial leg 12 forms a sump which defines an upwardly opening food debris collecting space 13.

A water ejection port 24 opens the interior of the vessel at its front wall 2. In the preferred embodiment, the water ejection port 24 is helically threaded and is removably covered against gas emissions by a helically threaded cap 25. In a preferred embodiment, the ejection port 24 is configured as a male end of a common garden hose coupler.

The instant inventive grease separator 1 preferably further comprises left and right flow ports which respectively open at the left and right walls 6 and 8. In a preferred embodiment, the left and right flow ports comprise left and right hose or pipe attachment nipples 38 and 40. Preferably, nipples 38 and 40 respectively have inward extensions configured as annular flanges 39 and 41, such flanges respectively extending inwardly from the left and right walls 6 and 8. In the preferred embodiment, the left and right flow ports are respectively positioned at upper ends of the left and right walls 6 and 8 so that such ports may coincide with or overlie an upper water level within the vessel.

A further structural component of the instant inventive grease separator 1 comprises a separator baffle 34 which is fitted for receipt within the interior space of the vessel. At least a first water flow damping baffle is provided. Suitably, such water flow modifying member may be configured as a panel 30.

Alternatively, or additionally, the separator's water flow damping baffle components may comprise a water flow modifying member in the form of a sieve. As shown partially in dashed lines in FIG. 2, an example of a suitable sieve baffle is referred to generally by Reference Arrow 100. Such sieve 100 has an outer wall 102, an inner wall 106 opposite the outer wall 102, lateral and oppositely lateral walls 104 and 105, and a floor 108. The sieve 100 preferably opens upwardly, and the floor 108, lateral wall 104, and oppositely lateral wall 105 preferably include multiplicities of apertures for performance of the sieve's food debris straining function. The sieve's inner wall 106 may suitably be similarly apertured. Alternatively, for enhanced flow damping effect, the inner wall 106 may be substantially imperforate, as depicted.

A hook extension 110 having an outwardly extending hooking flange 112 and a ridge engaging hook tail 114 is preferably fixedly attached at the upper end of the sieve's outer wall 102. Such hooking components facilitate convenient suspension of the sieve 100 either at the upper end of the vessel's left wall 6 or at the upper end of the right wall 8.

To facilitate inward flows of untreated waste water, the inner wall 102 of the sieve 100 preferably has an intake port 116, such port being fitted for alternatively receiving the left annular flange 39 and the right annular flange 41.

The instant inventive grease separator 1 preferably comprises at least a first flow damping baffle which is configured either similarly with sieve 100 or similarly with panel 30. However, in a preferred embodiment, both of such structures are provided, the sieve configured baffle being positioned with respect to the panel configured baffle oppositely from the separator baffle.

Specialized mounting means are preferably provided for fixedly and interchangeably mounting the separator baffle 34 and the flow damping baffles 30 and/or 100 within the interior of the vessel. In a preferred embodiment, the mounting means comprise a plurality of slide channel and slide ridge combinations, the slide ridges of such combinations comprising the front and rear edges of panels 30 and 34, and the slide channels of such combinations comprising vertically extending and inwardly opening "C" channels 28, 29, 26, and 27. In the preferred embodiment, such "C" channels are welded to the inner surfaces of the front and rear walls 2 and 4, and such channels are fitted for slidably and interchangeably receiving the panels 30 and 34. Such panels respectively have stop flanges 32 and 36 which effectively terminate the downward travels of the panels 30 and 34 within their "C" channel pairs 26,27, and 28,29. Flanges 32 and 36 additionally function as finger grasps or handles for upwardly and downwardly moving the panels 30 and 34 within their "C" channels.

In the preferred embodiment, the panels 30 and 34 have depth dimensions which extend downwardly from their upper flanges 32 and 36, the depth extension of the separator baffle or panel 34 preferably exceeding that of the water flow damping baffle or panel 30.

The invention's hook configured mounting means 110, 112,114, and the invention's slide channel and slide ridge combination configured mounting means 26,27,28,29 are intended as being representative of differently configured and differently attachable hooking elements and differently configured flanged attaching components. For example, the orientations of the ridge and channel halves of the slide ridge and slide channel combinations may be reversed from their depicted orientations. As a further example, each of the left and right flanges of the "C" channels 26,27,28,29 is representative of an overlapping flange which may constitute a component of an eyed flange and screw fastener combination (not depicted within views). Other commonly known and similarly functioning releasable fasteners are considered as falling within the scope of the invention.

An electric motor powered submersible pump 120 has lower end water and debris intake ports 122 which are downwardly situated within the interior space or well 13 of sump 12. The pump 120 is powered by an electrical power cord 66, and has a forwardly extending output pipe 124 which communicates with water ejection port 24.

In use of the instant inventive grease separator 1, the waste water drain of a commercial kitchen dishwasher or commercial kitchen sink (not depicted within views) may be situated to the left of the grease separator 1. In such circumstances, a drain hose or drain pipe may be rightwardly extended from such dishwasher or sink to communicate with the left flow port at nipple 38. Such leftward attachment establishes the grease separator's left flow port at wall 6 as a waste water intake port, and requires that the unit's flow damping baffle 100 and/or 30, as the case may be, be leftwardly situated with the vessel's interior. Accordingly, in such leftward sink facilitating configuration, "C" channels 26 and 27 slidably receive the front and rear edges of panel 26 and the upper end or lip of the left wall 6 engages hook 110,112,114. Correspondingly, "C" channels 28 and 29 slidably receive the separator panel 34 at the opposite rightward end of the vessel.

In the leftward sink facilitating configuration represented by FIG. 2, grease and food debris ladened waste water which passes through the left flow port 38 enters the interior of sieve 100, and larger fragments of food debris are advantageously trapped within the interior of sieve 100. Both the inner wall 106 of sieve 100 and panel 30 function as flow damping baffles which effectively reduce the speed of the waste water as it flows rightwardly and downwardly beneath the lower end of panel 30. Such waste water flow continues rightwardly through space 31 between the lower edge of panel 30 and the upper surface of floor 10. Such flow continues further rightwardly to reach separator panel 34. At such point, grease within the grease ladened water advantageously buoyantly floats upwardly to a level above the lower edge of panel 34, allowing grease free waste water to pass further rightwardly through the space 35 between the lower end of panel 34 and the upper surface of floor 10.

Such grease free waste water may then further flow rightwardly to exit the right flow port 40. Thereafter, a hose or pipe (not depicted within views) may carry such water to a drainage point such as a sewer drain.

Figure 3:
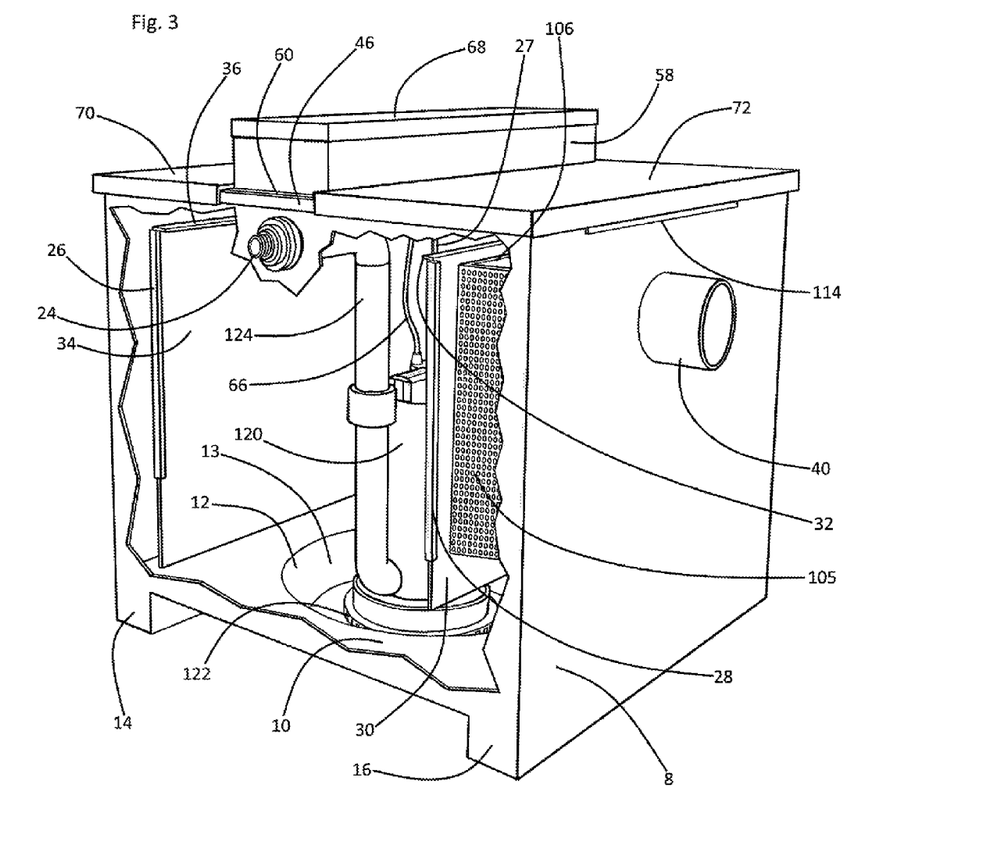
FIG. 3 presents an alternative perspective view of the structure of FIG. 2, the view of FIG. 3 showing a reversal of positionings of separator and flow damping baffle components.
Figure 4:
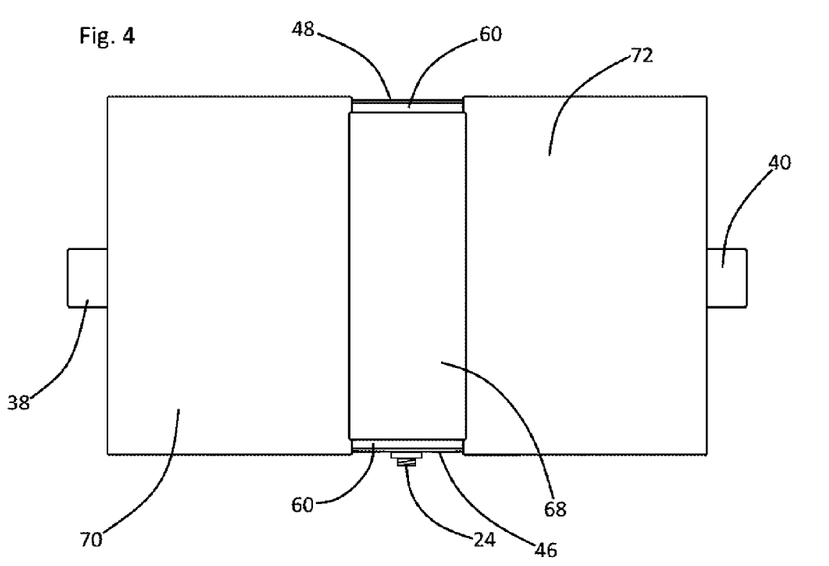
FIG. 4 is a vertical plan view of the separator of FIG. 1.
Figure 5:
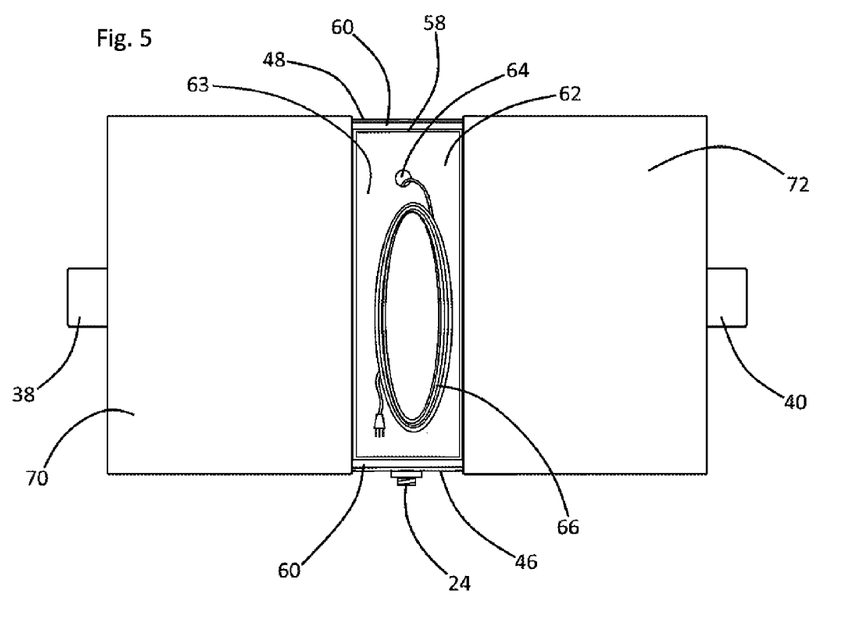
FIG. 5 redepicts the structure of FIG. 4, the view of FIG. 5 showing a cap component removed.
Figure 6:
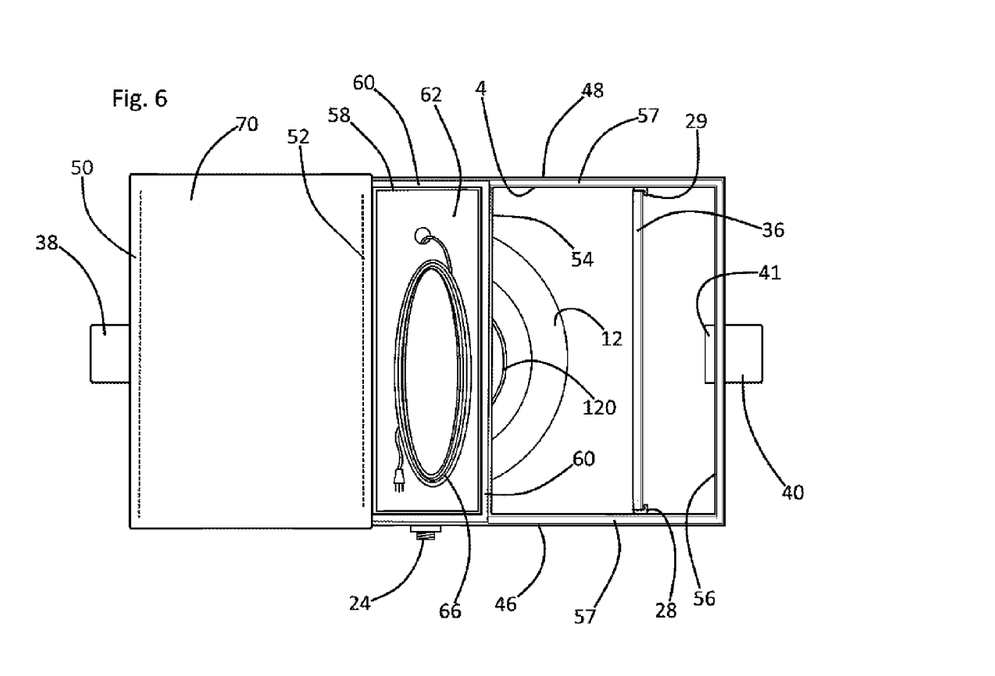
FIG. 6 redepicts the structure of FIG. 5, the view of FIG. 6 further showing a right lid component removed.
Figure 7:
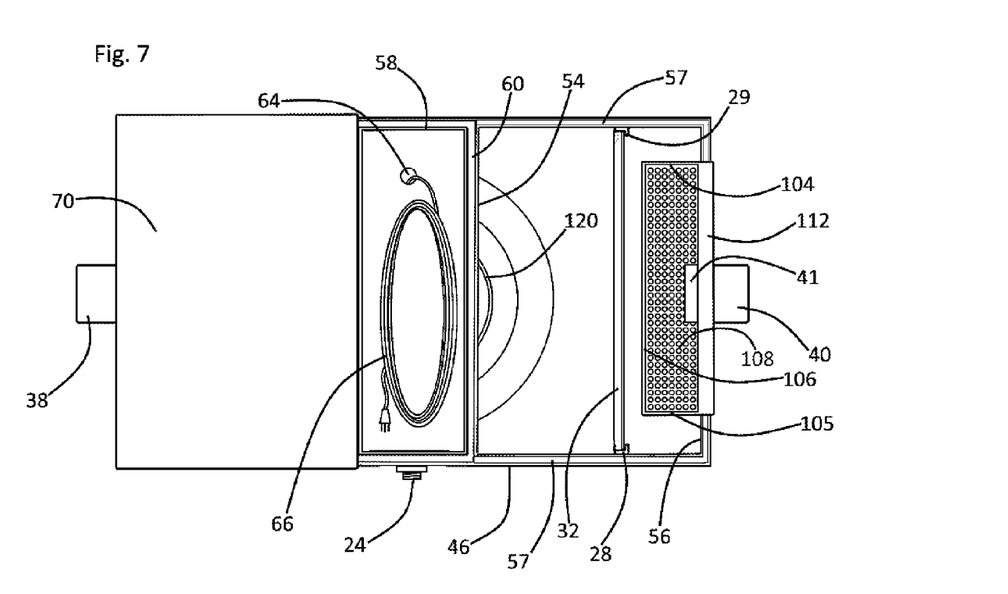
FIG. 7 is a vertical plan view of the structure of FIG. 3, the view of FIG. 7 showing cap and right lid components removed.

FIG. 3 represents a convenient alternative configuration of the grease separator 1 which advantageously accommodates a positioning of the separator unit 1 to the left of a commercial kitchen's sink or dishwasher. In the FIG. 3 configuration, the invention's mounting means have advantageously allowed the lateral positions of the baffle panels 30 and 34 and the lateral positioning of sieve configured baffle 100 to be reversed right to left with respect to their FIG. 2 positions.

To facilitate convenient storage of and convenient access to the electric pump's power cord 66, the grease separator 1 preferably further comprises a chambered lid which is referred to generally by Reference Arrow 59. The chambered lid has a floor 62 whose lower surface dually functions as a vessel ceiling segment. Peripheral walls 58 extend upwardly in a box formation from the peripheral ends of floor 62, and a peripheral mounting flange 60 extends horizontally from the chambered lid's lower end. The walls 58, in combination with floor 62, define an electric power cord receiving space 63, and in the preferred embodiment, a power cord receiving port 64 upwardly opens the vessel while downwardly opening the chamber 59. Such port 64 conveniently receives the coiled end of the power cord 66 for storage. A fitted cap 68 preferably covers the upper opening of the chambered lid 59.

In the preferred embodiment of the instant invention, the chambered lid 59 covers only a central or medial portion of the upper opening of the vessel, and fitted left and right lids 70 and 72 are preferably further provided for covering the remaining left and right portions of the vessel's upper opening.

Structural support and rigidity of the upper lip or upper edges of the vessel is preferably provided via a rigid ladder frame element which is preferably composed of lengths of stainless steel square tubing. The ladder frame preferably has a front rail 46, a rear rail 48, and a plurality of rungs 50, 52, 54, and 56. Rungs 50 and 56 provide secure undergirding support to the respective left and right ends of the left and right lids 70 and 72, while each of the medially positioned rungs 52 and 54 dually supports both a chambered lid end and a left or right lid end. Correspondingly, the ladder frame's rungs 46 and 48 respectively provide secure support to the front and rear ends of each of the invention's lid components.

In order to resist emanations of odors from the interior of the vessel, elastomeric sealing strips 57 may be applied to all of the overlapping interfaces between the ladder frame's upper surfaces and the lid's lower surfaces.

Upon removal of lids 59, 70, and 72, the ladder frame's medial rungs 52 and 54 may dually function as handles which assist in manual carriage of the separator 1 to and from installation sites.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope at least commensurate with the appended claims.

The invention hereby claimed is:

1. A grease separator comprising:
 (a) a vessel having an upper opening and having an interior space having lower, left, and right ends, the vessel further having a floor, a front wall, a rear wall, a left wall, and a right wall;
 (b) a water ejection port opening the vessel, the water ejection port being positioned at the front wall;
 (c) left and right flow ports further opening the vessel, the left and right flow ports being respectively positioned at the left and right walls;
 (d) a separator baffle and at least a first damping baffle;
 (e) mounting means adapted for alternatively positioning the separator baffle at the left and right ends of the vessel's interior, the mounting means being further adapted for positioning the at least first damping baffle at an interior space end opposite from the separator baffle; and
 (f) a submersible pump having a water intake port positioned at the lower end of the vessel's interior space, the submersible pump having an output communicating with the water ejection port.

2. The grease separator of claim 1 wherein the mounting means comprise releasable fasteners selected from the group consisting of slide ridge and slide channel combinations, eyed flange and screw combinations, and hook and hook ridge combinations.

3. The grease separator of claim 2 wherein the separator baffle and the at least first damping baffle have vertical depths, the vertical depth of the separator baffle being greater than that of the at least first damping baffle.

4. The grease separator of claim 3 wherein the at least first damping baffle comprises a flow modifying member selected from the group consisting of sieves and flat panels.

5. The grease separator of claim 4 wherein the selected flow modifying member comprises a flat panel, and further comprising a sieve, the mounting means being further adapted for positioning the sieve oppositely from the separator baffle with respect to the flat panel.

6. The grease separator of claim 5 wherein upper ends of the left and right walls form hook ridges, and wherein the mounting means' further adaptations comprise a hook fixedly attached to and extending upwardly from the sieve, the hook being adapted for alternatively engaging the left wall's hook ridge and the right wall's hook ridge.

7. The grease separator of claim 1 further comprising a plurality of support legs fixedly attached to and extending downwardly from the floor, one of the support legs comprising a sump, the submersible pump's water intake port being received within the sump.

8. The grease separator of claim 1 wherein the submersible pump comprises an electric motor having a power cord, and further comprising a chambered lid having front, rear, left and right ends, the chambered lid being fitted for covering at least a portion of the vessel's upper opening, the chambered lid having a cord passage port receiving the power cord.

9. The grease separator of claim 8 wherein the chambered lid opens upwardly, and further comprising a cap fitted for covering the chambered lid's upper opening.

10. The grease separator of claim 8 wherein the chambered lid covers a medial portion of the vessel's upper opening, and further comprising left and right lids having front, rear, left and right ends, said lids being respectively fitted for covering left and right portions of the vessel's upper opening.

11. The grease separator of claim 10 wherein the vessel's upper opening comprises a ladder frame having front and rear rails and having a plurality of rungs, the ladder frame's front and rear rails respectively supporting the front and rear ends of the chambered lid, the left lid, and the right lid, and the ladder frame's rungs supporting said lids' left and right ends.

* * * * *